United States Patent
Sakaguchi

(10) Patent No.: US 8,135,872 B2
(45) Date of Patent: Mar. 13, 2012

(54) USB CONTROLLER AND A TESTING METHOD OF THE USB CONTROLLER

(75) Inventor: Shinji Sakaguchi, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 145 days.

(21) Appl. No.: 12/068,931

(22) Filed: Feb. 13, 2008

(65) Prior Publication Data

US 2008/0235405 A1    Sep. 25, 2008

(30) Foreign Application Priority Data

Mar. 19, 2007    (JP) .................................. 2007-071613

(51) Int. Cl.
*G06F 3/00* (2006.01)
*G06F 11/00* (2006.01)
*G01R 31/28* (2006.01)

(52) U.S. Cl. .............. 710/8; 710/14; 714/716; 714/734; 714/742

(58) Field of Classification Search ........................ 710/8
See application file for complete search history.

(56) References Cited

U.S. PATENT DOCUMENTS

| 6,052,362 | A * | 4/2000 | Somer | 370/246 |
| 7,049,839 | B1* | 5/2006 | Hsiao et al. | 324/750.3 |
| 2002/0190755 | A1* | 12/2002 | Lee | 326/86 |
| 2004/0128601 | A1* | 7/2004 | Muljono et al. | 714/734 |
| 2004/0153856 | A1* | 8/2004 | Saotome et al. | 714/43 |
| 2005/0097403 | A1* | 5/2005 | Chen | 714/43 |
| 2005/0258856 | A1* | 11/2005 | Kishimoto et al. | 324/765 |
| 2006/0059394 | A1* | 3/2006 | Spirkl | 714/718 |
| 2007/0047337 | A1* | 3/2007 | Iizuka | 365/193 |
| 2007/0089009 | A1* | 4/2007 | Nishizawa | 714/738 |
| 2007/0127614 | A1* | 6/2007 | Kawakami | 375/373 |
| 2008/0163012 | A1* | 7/2008 | Nair | 714/716 |

FOREIGN PATENT DOCUMENTS

| JP | 2004-021742 | 1/2004 |
| JP | 2004-260677 | 9/2004 |

* cited by examiner

*Primary Examiner* — Henry Tsai
*Assistant Examiner* — Kris Rhu
(74) *Attorney, Agent, or Firm* — Dickstein Shapiro LLP

(57) ABSTRACT

A USB controller and a testing method of the USB controller are disclosed. The USB controller includes
a sequence control unit for outputting a transmitting enable signal and a receiving enable signal, and for controlling a sequence of transmission and reception of data based on the transmitting enable signal and the receiving enable signal;
a driver unit for transmitting data;
a receiver unit for receiving data;
a register for setting up a test mode wherein a loop-back test of the USB controller is performed; and
a switching unit for providing one of the transmitting enable signal to the receiver unit and the receiving enable signal to the driver unit, if the test mode is set up in the register;
wherein the loop-back test is performed if the test mode is set up in the register.

15 Claims, 8 Drawing Sheets

USB CONTROLLER AND A TESTING METHOD OF THE USB CONTROLLER

BACKGROUND OF THE INVENTION

1. Field of the Invention

The present invention relates to a USB controller and a testing method of the USB controller.

2. Description of the Related Art

[Background Technique]

A communication standard, USB (Universal Serial Bus) 2.0, is widely used by various computer devices. The USB is one of several serial interface standards for connecting peripheral devices such as a keyboard and a mouse to a PC (a host PC) so that data communications between the devices and the PC may be carried out. The USB 2.0 offers high-speed communications, and is capable of connecting two or more devices to a hub that is connected to a port of the PC, which is an advantage over conventional interface standards. For this reason, the USB 2.0 has become a de-facto standard interface between PCs and peripheral devices. Here, the USB 2.0 is capable of providing a communication bit rate of 480 Mbps.

FIG. 1 shows a configuration example of a conventional USB controller 1, which is an IC (Integrated Unit) for controlling a device adopting the USB 2.0 specification. The USB controller 1 is for communicating according to the USB 2.0 specifications with a host PC that is not illustrated, and includes a PHY layer (PHYsical layer) 2, and a LINK layer 3. The PHY layer 2 is an analog unit for converting data and signals exchanged with the host PC; it includes a transceiver unit for serial communications of serial data with the host PC, a serial/parallel converter, and a data modulator/demodulator. The LINK layer 3 is a digital unit for recognizing an address of the data, an identification of the transmitting origin, boundaries of data, and the like, and includes a communication protocol unit for controlling a communication protocol. The functional units described above may be separately integrated into individual ICs, or alternatively, all of the functional units may be integrated into one IC.

When the PHY layer 2 and the LINK layer 3 are separately integrated into individual ICs, they interface according to a UTMI (USB 2.0 Transceiver Macro Interface) specification. Further, a ULPI (UTMI+Low Pin Interface) specification, which is an extended version of the UTMI specification, is also available. According to the UTMI specification, interface transmission speeds of 60 MHz×8 bits, and 30 MHz×16 bits are available for selection. Further, according to the ULPI specification, the interface transmission speed is 60 MHz×8 bits.

A problem to solve when developing a USB controller device is concerned with testing the device at a high speed. As described above, the communication bit rate of the USB 2.0 is 480 Mbps (=8 bits×60 MHz). For testing the IC at this high speed, a very expensive test jig is necessary. Therefore, in a manufacturing process of the IC, logic testing is often excluded to dispense with the costly test jig, and the IC is mounted on an evaluation board or the like so that functional testing of operations may be performed. If inferior goods can be eliminated at an early stage of a testing process in manufacturing, it is possible to eliminate unnecessary man-hours and cost of testing.

In this view, various techniques have been disclosed in an attempt to improve testing efficiency of IC operations at the high-speed communications.

For example, Patent Reference 1 discloses a communication device that is capable of detecting an abnormality of a transceiver in communications state close to real operations wherein a frequency error, transmission jitter, clock waveform fluctuation, and phase-angle fluctuation are added by a loop-back operation for reducing the testing cost. Here, evaluation of internal DRC (Design Rule Check), an elastic buffer, and a decoder are carried out by changing timing by a phase-adjustment (clock modulation) unit, and the like. Further, Patent Reference 2 discloses a USB device controller that can satisfy restrictions of an inter-packet delay time in the USB specification with a small-scale circuit.

[Patent reference 1] JPA 2004-260677
[Patent reference 2] JPA 2004-021742

DISCLOSURE OF THE PRESENT INVENTION

Objective of the Present Invention

However, according to Patent Reference 1, there is a problem in that it requires a test circuit that operates at the high speed of 480 MHz, or even higher than 480 MHz for a phase adjustment. Further, such a high-speed test unit leads to an increase in mounting space, and due to the high-speed, mounting difficulty and cost are also increased.

SUMMARY OF THE INVENTION

The present invention provides a USB controller and a USB controller test method that substantially obviate one or more of the problems caused by the limitations and disadvantages of the related art.

Specifically, an embodiment of the present invention provides a USB controller and a USB controller test method that realize functional testing by a simple configuration.

Features of embodiments of the present invention are set forth in the description that follows, and in part will become apparent from the description and the accompanying drawings, or may be learned by practice of the invention according to the teachings provided in the description. Problem solutions provided by an embodiment of the present invention may be realized and attained by a USB controller and a USB controller test method particularly pointed out in the specification in such full, clear, concise, and exact terms as to enable a person having ordinary skill in the art to practice the invention.

To achieve these solutions and in accordance with an aspect of the invention, as embodied and broadly described herein, an embodiment of the invention provides a USB controller and a USB controller test method as follows.

[Means for Solving the Problem]

According to an aspect of the embodiment of the present invention, the USB controller includes a sequence control unit for outputting a transmitting enable signal and a receiving enable signal, and for controlling a sequence of transmission and reception of data based on the transmitting enable signal and the receiving enable signal;

a driver unit for transmitting data;

a receiver unit for receiving data;

a register for setting up a test mode wherein a loop-back test of the USB controller is performed; and a switching unit for providing one of the transmitting enable signal to the receiver unit and the receiving enable signal to the driver unit, if the test mode is set up in the register;

wherein the loop-back test is performed if the test mode is set up in the register.

According to another aspect of the embodiment, the USB controller further includes an error information storing register for storing error information concerning the loop-back test.

According to another aspect of the embodiment, the USB controller further includes a data storing register for storing transmitting data and/or receiving data for the loop-back test.

Another aspect of the embodiment provides a test method of the USB controller as described above, wherein the test method includes:

a switching process of providing one of the transmitting enable signal to the receiver unit and the receiving enable signal to the driver unit, if the test mode is set up in the register; and a process of the loop-back test, wherein the receiver unit receives data transmitted by the driver when the switching process is performed.

According to the test method of the USB controller in another aspect of the embodiment, the test mode is set up in the register using an interface based on UTMI or ULPI of the USB controller.

EFFECTIVENESS OF INVENTION

According to the USB controller and USB controller test method of the embodiment of the present invention, functional testing of the USB controller is realized by a simple configuration.

DESCRIPTION OF THE PREFERRED EMBODIMENTS

Figure 1:
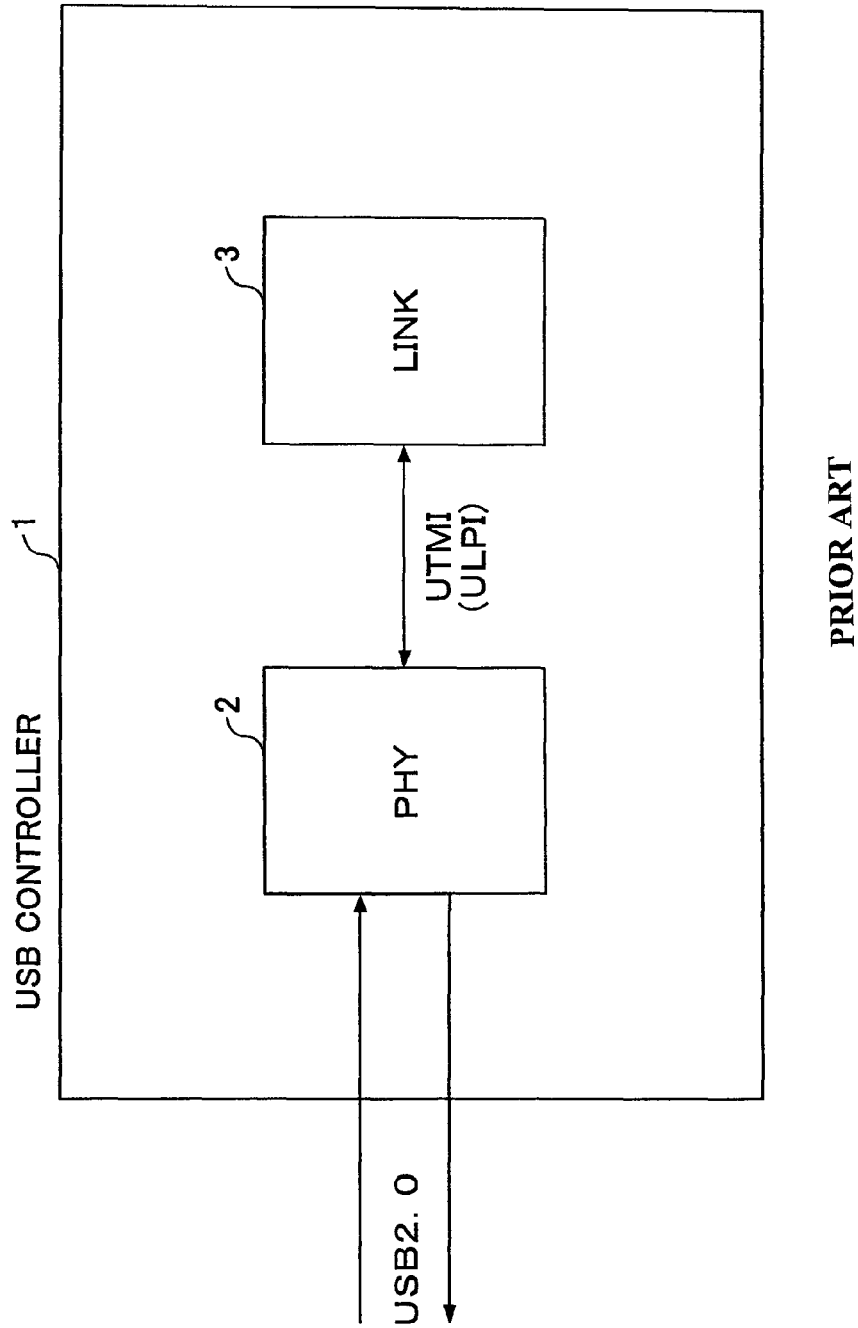
FIG. 1 is a block diagram of a conventional USB controller.

In the following, embodiments of the present invention are described with reference to the accompanying drawings. In addition, supplementary descriptions are given about the conventional USB controller 1 shown in FIG. 1.

(Configuration of PHY Layer)

Figure 2:
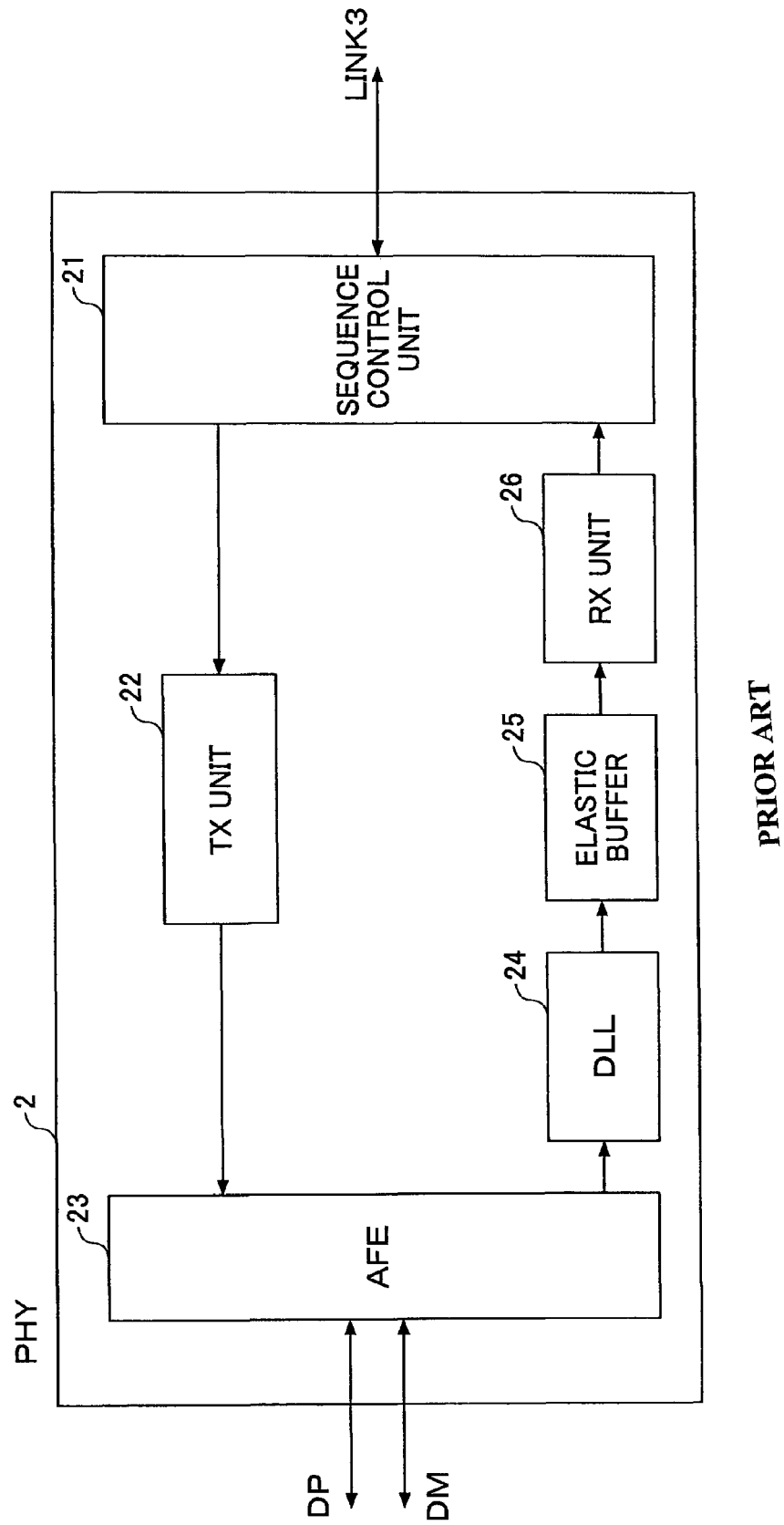
FIG. 2 is a block diagram of a PHY (physical) layer of the conventional USB controller.

FIG. 2 shows a configuration example of a PHY layer (physical layer) 2 of the conventional USB controller 1. In FIG. 2, the PHY layer 2 includes a sequence control unit 21, a TX (Transmitter) unit 22, an AFE (Analog Front End) 23, a DLL (Delay Locked Loop) 24, an elastic buffer 25, and a RX (Receiver) unit 26.

The sequence control unit 21 is for controlling a sequence for transmission and reception of data. The sequence control unit 21 controls, for example, operational sequences of the TX unit 22, the AFE 23 the DLL 24, the elastic buffer 25, and the RX unit 26. The TX unit 22 is for controlling transmission of data.

The AFE 23 is for converting an analog signal into a digital signal, and vice versa. For example, DP/DM signals received from the host PC are converted into a digital signal, and a digital signal received from the TX unit 22 is converted into the DP/DM signals. Detailed descriptions about the AFE 23 are given below with reference to FIG. 3.

The DLL 24 is for adjusting the difference between a clock signal and a data bus. For example, a frequency phase angle of a sampling clock of the USB controller 1 is adjusted according to the data received from the host PC through the AFE 23. For example, the frequency phase angle of the sampling clock is adjusted by detecting an edge of the received data.

The elastic buffer 25 is for synchronizing the data taken into the DLL 24 at the sampling clock speed to a 480 MHz reference clock used by the RX unit 26 and afterward. The RX unit 26 is for controlling reception of the data.

By the configuration described above, the PHY layer 2 performs a differential type data transfer using two bi-directional buses DP and DM to/from the host PC (not illustrated). An example of operations when transmitting and receiving the data between a peripheral device (the USB controller 1 containing the PHY layer 2) and the host PC is described.

First, the case wherein the USB controller 1 transmits data to the host PC is described. The sequence control unit 21, the TX unit 22, and AFE 23 are used for transmitting operations. First, the sequence control unit 21 of the PHY layer 2 shown in FIG. 2 receives data to be transmitted (transmission data) from the LINK layer 3 by communication based on, e.g., the UTMI specification (here, synchronous transmission at 60 MHz×8 bits).

The TX unit 22 serializes the data received from the sequence control unit 21 with a 480 MHz clock, where the data are to be transmitted. Further, NRZI (Non Return to Zero Inverted) encoding and bit stuffing specified by the USB specification are applied to the serialized data to be transmitted. Here, bit stuffing reverses a signal polarity if a predetermined "bit section change" does not take place in the serial signal. Further, NRZI encoding reverses the signal polarity if the value of the serial signal is 0, and maintains the previous polarity if the value of the serial signal is 1.

The serial data, to which the above coding processes are performed, are transmitted to the AFE unit 23. Then, the AFE unit 23 outputs the received serial data to the host PC (not illustrated) from DP/DM terminals. In this way, the USB controller 1 transmits the data to the host PC.

Next, the case wherein the USB controller 1 receives data from the host PC is described. The sequence control unit 21, the AFE 23, the DLL 24, the elastic buffer 25, and the RX unit 26 are used for the receiving operations. First, the AFE 23 receives data as an analog signal from the host PC through the DP/DM terminals. The AFE 23 converts the received analog signal into a digital signal. Here, the data bit rate of the received signal is the same as the sampling clock frequency of the USB controller 1.

Then, the DLL 24 receives the digital signal from the AFE 23, and adjusts the phase angle of the sampling clock according to the received data. Here, an optimal frequency phase angle of the sampling clock is adjusted by detecting an edge of the received data. Then, the elastic buffer 25 synchronizes the data taken in with the sampling clock speed adjusted by the DLL 24 to the reference clock signal of 480 MHz. The RX unit 26 carries out NRZI decoding and bit de-stuffing of the serial data that are made in sync with the reference clock of the USB controller 1 by the DLL 24 and the elastic buffer 25; and then, converts the serial data into parallel data.

Then, the sequence control unit 21 provides the parallel data to the LINK layer 3 by communications based on, e.g., the UTMI specification (here, the synchronous transmission at 60 MHz×8 bits). In this way, the USB controller 1 receives the data from the host PC.

Here, the data transmission between the PHY layer 2 and the LINK layer 3 is performed by the synchronous transmission at 60 MHz×8 bits; nevertheless, in the case of transmission according to the UTMI specification, 30 MHz×16 bits is available.

Further, the sequence control unit 21 controls data transmission timing between the PHY layer 2 and the LINK layer 3, and operations of all the units shown in FIG. 2. Further, if the data received by the PHY layer 2 from the host PC contains an error such as an encoding violation or a bit stuffing violation, the sequence control unit 21 manages the error and provides information on the error to the LINK layer 3 with the received data.

The sequence control unit 21 further includes a register (not illustrated), which is a storage unit for storing information for setting a PHY mode, and the like, so that the USB controller 1 may meet the telecommunications standard set forth by the USB specification. In addition, FIG. 2 shows only units that are concerned with high-speed communications, and the PHY layer 2 may include a functional unit other than those illustrated in FIG. 2.

(Configuration of AFE)

Next, the configuration of the AFE 23 is described with reference to FIG. 3 that illustrates an example of a part of the AFE 23 according to the conventional practice. Although the AFE 23 includes other functional units so that many functions for complying with the USB specification may be provided, only the part that is related to the embodiment of the present invention is illustrated here.

Figure 3:
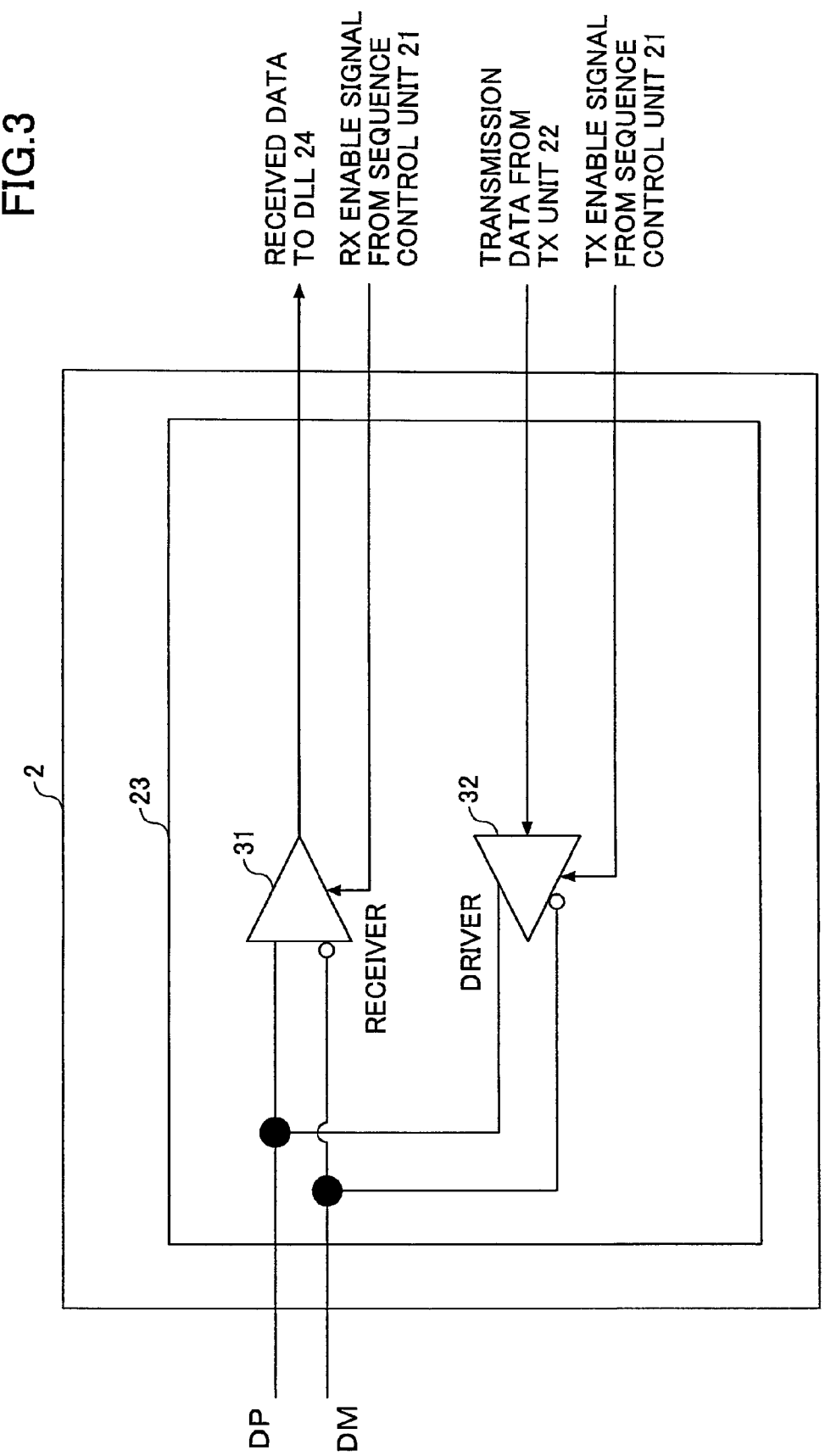
FIG. 3 is a block diagram of an AFE of the conventional USB controller.

As shown in FIG. 3, the AFE 23 includes a receiver 31 for receiving data from the DP/DM terminals, and a driver 32 for transmitting data to the DP/DM terminals. The DP/DM terminals lead to corresponding bi-directional buses, and each is connected to both receiver 31 and driver 32.

Then, operations of the AFE 23 are described focusing on operations of the receiver 31 and the driver 32. The receiver 31 and the driver 32 are controlled by a RX-enable signal (a control signal for receiving) and a TX-enable signal (a control signal for transmission), respectively. The enable signals are provided by the sequence control unit 21 such that the receiver 31 and the driver 32 may not simultaneously function. Further, the RX-enable signal controls the DLL 24, the elastic buffer 25, and the RX unit 26 (collectively, the receiving system) of the PHY layer 2, and the TX-enable signal controls the TX unit 22 (the transmitting system) of the PHY layer 2. In this way, the USB controller 1 is arranged such that data reception may not be activated during data transmission to the host PC, and vice versa.

With the configuration and the operations described above, the USB controller 1 is capable of performing data transmission in compliance with the USB specification. However, the USB controller 1 handles high-speed communications of USB 2.0 at 480 MHz. For this reason, when the USB controller 1 is tested in a manufacturing process, a jig for inputting/receiving a 480 MHz signal to/from the DP/DM terminals is required. A problem is that the jig is expensive.

Then, according to the present invention as embodied hereafter, testing of the 480 MHz operations of the USB controller 1 is simply performed with a simple configuration using an inexpensive test jig.

[Embodiment 1]

Figure 4:
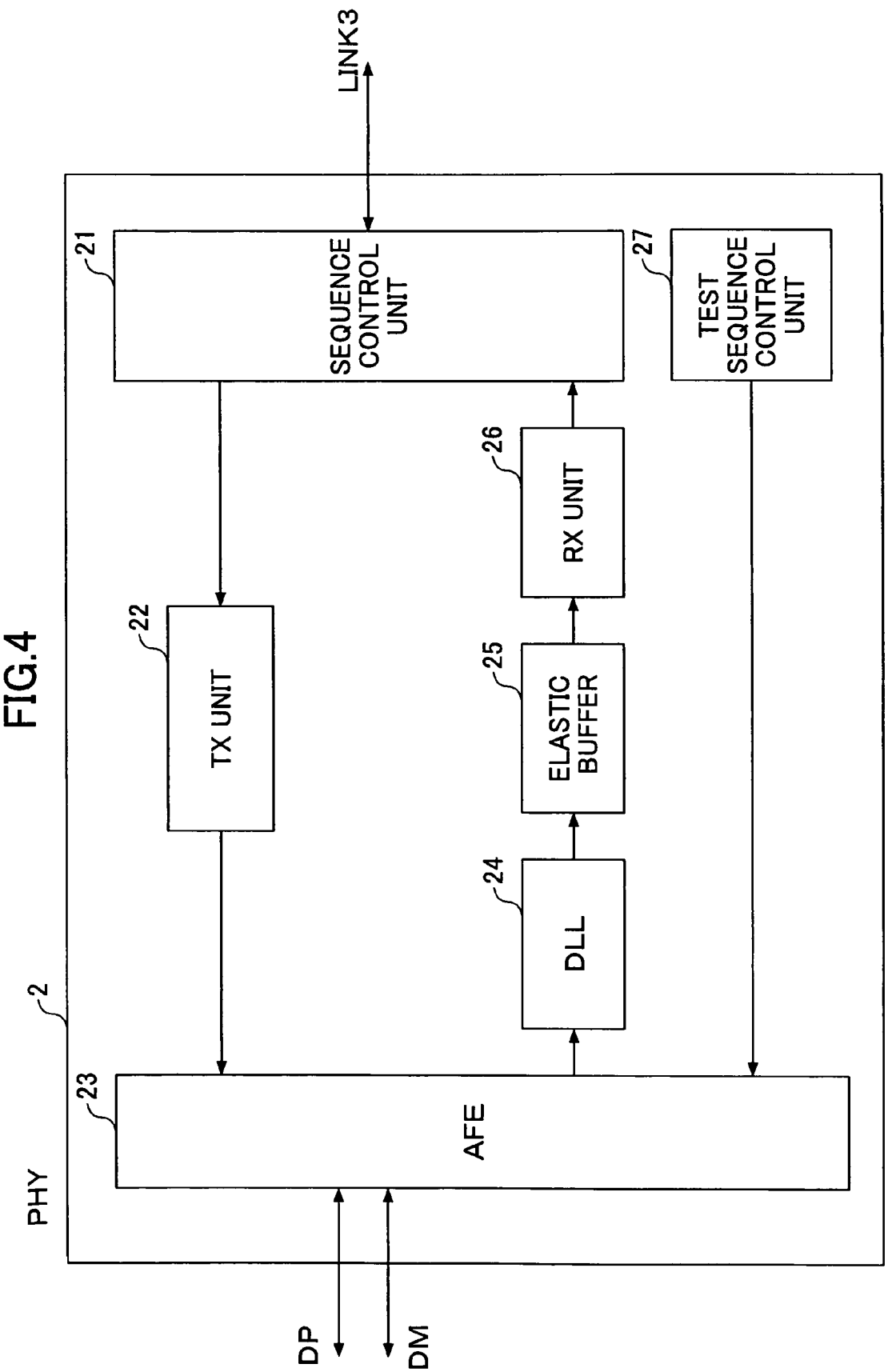
FIG. 4 is a block diagram of the PHY layer of a USB controller according to Embodiment 1 of the present invention.
Figure 5:
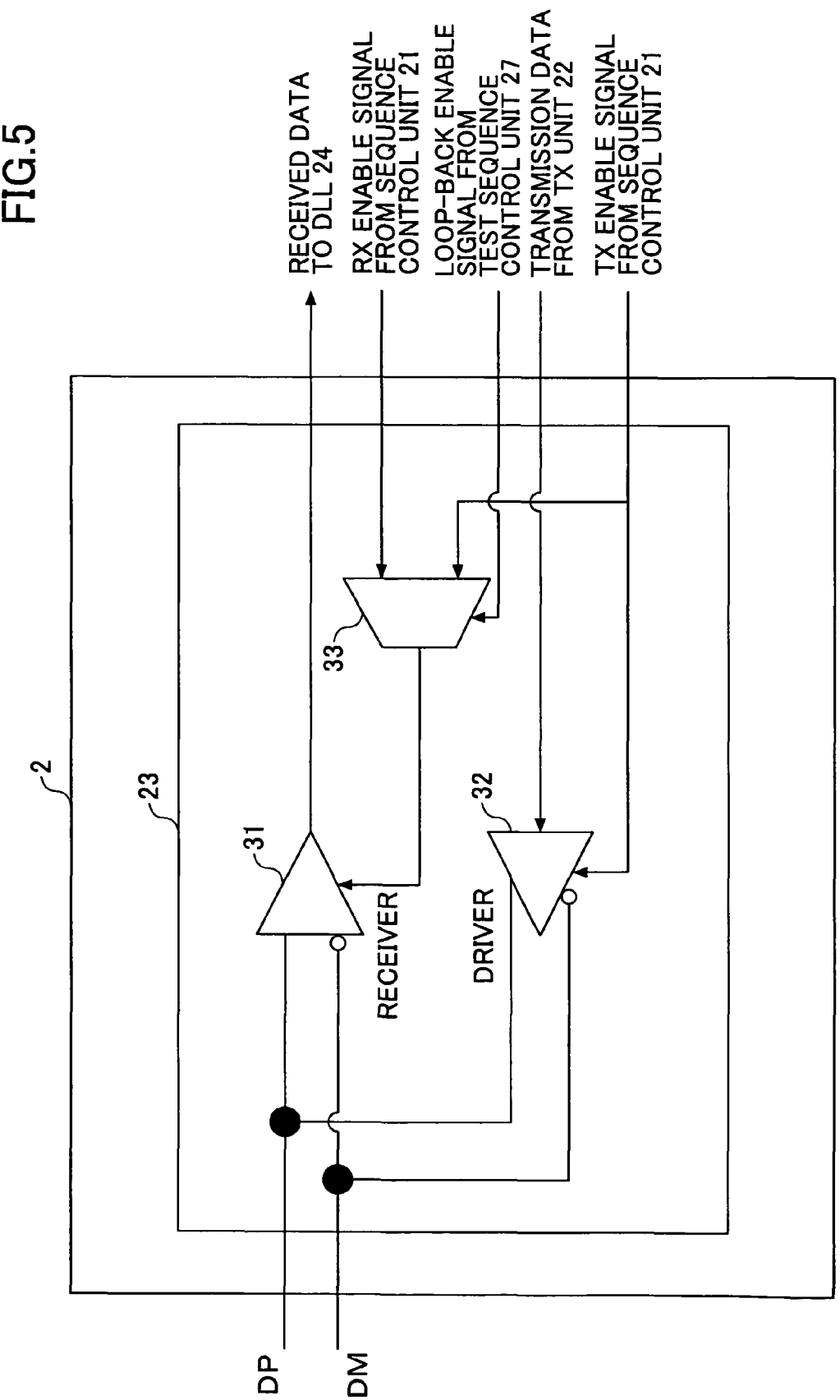
FIG. 5 is a block diagram of the AFE of the USB controller according to Embodiment 1 of the present invention.
Figure 6:
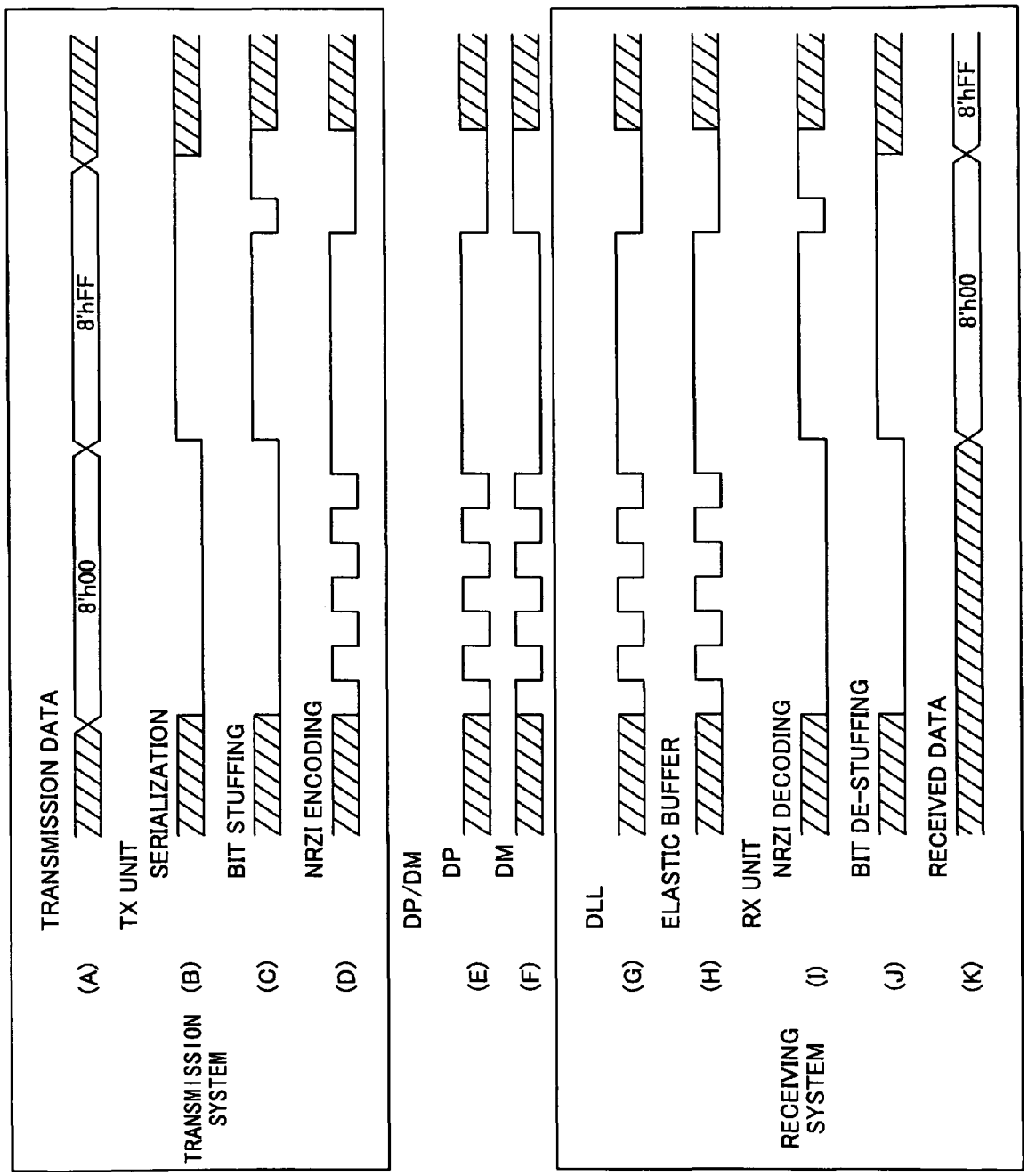
FIG. 6 is a signal plan of a USB controller test method according to Embodiment 1 of the present invention.

Hereafter, Embodiment 1 of the present invention is described with reference to FIGS. 4 through 6.

(Configuration of PHY Layer)

First, a configuration example of the PHY layer 2 of the USB controller 1 according to Embodiment 1 is described with reference to FIG. 4 that shows the configuration example of the PHY layer 2 of the USB controller 1 according to Embodiment 1. The PHY layer 2 according to Embodiment 1 includes a test sequence control unit 27 in addition to the conventional configuration shown in FIG. 2. Accordingly, the test sequence control unit 27 is described.

The test sequence control unit 27 is for controlling a test sequence of the USB controller 1. The test sequence includes a receiving sequence for receiving data. In this case, the sequence control unit 21 controls a transmitting sequence for transmitting data.

Since the sequence control unit 21 controls the sequence of data transmission, and the test sequence control unit 27 controls the sequence of receiving data, the transmission data can be transmitted while the receiving data are being received.

Here, the receiving system (the DLL 24, the elastic buffer 25, and the RX unit 26) of the PHY layer 2 is completely independent of the transmitting system (TX unit 22). Further, an operation mode (for example, a normal operation mode, and a functional test mode) of the USB controller 1 is specified by mode information stored in a register (not illustrated) of the test sequence control unit 27. Only when the functional test mode is specified, the test sequence control unit 27 is activated. In other words, the test sequence control unit 27 is for testing the operations of the conventional PHY layer 2 of the USB controller 1 as shown in FIG. 2.

(Configuration of AFE)

Next, a configuration example of the AFE 23 of the USB controller 1 according to Embodiment 1 is described with reference to FIG. 5, wherein the configuration example of the AFE 23 of the USB controller 1 according to Embodiment 1 is shown. The AFE 23 of Embodiment 1 includes a multiplexer 33 in addition to the configuration of the conventional AFE 23 shown in FIG. 3. Accordingly, the multiplexer 33 is described.

The multiplexer 33 has a switching function of selecting one of the RX-enable signal and the TX-enable signal according to a loop-back enable signal provided by the test sequence control unit 27, and the selected enable signal is provided to the receiver 31. For example, in the normal operation mode, the RX-enable signal is provided to the receiver 31 (the same as in FIG. 3); and in the functional test mode, the TX-enable signal is provided to the receiver 31.

With the above configuration, both receiver 31 and driver 32 are activated by the TX-enable signal in the functional test mode. Since outputs of the driver 32 are connected to inputs of the receiver 31 within the USB controller 1, the output of the driver 32 is provided to the receiver 31. That is, data output by the USB controller 1 can be received by the USB controller 1, and a loop-back test is made possible without a host PC being connected to the USB controller 1.

As described above, according to Embodiment 1, by providing data from the LINK layer 3 to the PHY layer 2, the TX unit 22, the AFE 23, the DLL 24, the elastic buffer 25, and the RX unit 26 can operate at 480 MHz; that is, the USB controller 1 can simulate real operations without input/output from/to outside through the DP/DM terminals.

In the functional test mode, the data to be transmitted provided by the LINK layer 3 are processed by the TX unit 22 (serializing process at 480 MHz, NRZI encoding, and bit stuffing), and are restored to the original data by the RX unit 26 (bit de-stuffing, NRZI decoding, and parallelizing process). If an error is generated in the data processes through the loop-back system, constituted by the transmitting system and the receiving system, or if synchronization by the DLL 24 and/or the elastic buffer 25 fails, an error is generated by the receiving system like in the case of real operations.

Here, an existing UTMI/ULPI register may be used to set up whether verification is possible, and the functional test mode (such as the normal operation mode or the functional test mode). In this case, no interface pin for the functional test is required. Presence of an error in the transceiver system can be determined by adding an error information storing register for storing the test mode setup information, and the error information at the time of transmission and reception, where the error information storing register is accessible from the LINK layer 3 through the UTMI/ULPI interface, and by reading a value stored in the error information storing register.

Further, an external interface and an internal buffer may be additionally provided to the PHY layer 2. The internal buffer is for storing data received in the loop-back test, and the stored data are read through the external interface. By analyzing the read data, identifying a unit that generates the error is facilitated. Further, in this case, the register for setting up the test mode may be accessed through the external interface.

A test jig for testing the USB controller 1 of Embodiment 1 described above is required to generate a 60 MHz or a 30 MHz signal used by the interface of the LINK layer 3. Since this is not a high-speed signal, a commonly available inexpensive test jig can be used. As described, the USB controller 1 of Embodiment 1 that is simply configured can be tested by an inexpensive test jig.

(Example of Testing USB Controller)

Next, an example of a method of testing the USB controller 1 according to Embodiment 1 is described with reference to FIG. 6 (also see FIGS. 4 and 5). FIG. 6 is a signal plan for explaining the USB controller test method according to Embodiment 1.

When testing the USB controller 1 according to Embodiment 1, the operation mode is set to the functional test mode according to the mode information stored in the register (not illustrated). Accordingly, the multiplexer 33 is switched such that the TX-enable signal may be provided to the receiver 31 (refer to the FIG. 5). That is, the output of the driver 32 is connected to the input of the receiver 31 within the USB controller 1; in other words, the output of the driver 32 serves as the input to the receiver 31.

A loop-back test operation is described with reference to the signal plan of FIG. 6, wherein the sequence control unit 21 of the PHY layer 2 receives test data (parallel data) from the LINK layer 3, outputs the test data, and then receives the test data.

First, the sequence control unit 21 provides the test data (A), which are parallel data, to the TX unit 22. Then, the TX unit 22 serializes the test data (B), performs bit stuffing (C), and performs NRZI encoding (D). The test data have been converted into serial data for transmission.

Then, the serial data are provided to the driver 32 of the AFE 23 by the TX unit 22. The driver 32, which has received the serial data for transmission, generates the DP signal (E) and the DM signal (F), wherein the DP signal is provided to the DP terminal. Here, since the outputs of the driver 32 are connected to the corresponding inputs of the receiver 31, the DP signal and the DM signal output by the driver 32 are provided to the receiver 31. The receiver 31 generates received serial data based on the DP signal and the DM signal, and transmits the received serial data to the DLL 24 (G).

The DLL 24 optimizes the frequency of the sampling clock by detecting an edge of the received serial data. The elastic buffer 25 synchronizes the received serial data taken in at the sampling clock optimized by the DLL 24 to the 480 MHz clock (H). Here, in FIG. 6, the signals are shown assuming that the magnitude of the error concerning the adjustments by the DLL 24 and the elastic buffer 25 is sufficiently small.

Then, the received serial data that are frequency-optimized by the DLL 24 and synchronized by the elastic buffer 25 are provided to the RX unit 26. The received serial data are processed through a NRZI decoding process (I), a bit de-stuffing process (J), and a parallelizing process such that the received serial data are converted into parallel data (K).

In this way, the loop-back test is performed by the sequence control unit 21 of the PHY layer 2, wherein the test data (parallel data) (A) provided by the LINK layer 3 are output, and then received (K) by the sequence control unit 21.

If an error occurs in data processing of the loop-back system, which includes the transmitting system and the receiving system, or synchronization fails in the DLL 24 or the elastic buffer 25, the test sequence control unit 25 stores the error in a register, and the like, and manages the error. Here, FIG. 6 shows the case wherein no error has occurred between the test data (A) and the received data (K) is shown.

As described above, Embodiment 1 has the following advantages. The loop-back test within the PHY layer 2 of the USB controller 1 (within the IC) is made possible by providing the test sequence control unit 27 for the functional test. Further, the high-speed operations can be tested by the simple configuration using the small-scale and low-speed operation unit, dispensing with exchanges of high-speed signals with the exterior.

Further, with the capability of ascertaining the received data using the interface with the LINK layer 3, Embodiment 1 is useful in identifying an error location in addition to detecting the error in the loop-back system by the loop-back test. In this case, it is not necessary to additionally provide an external interface to the conventional PHY layer 2 because the UTMI/ULPI interface with the LINK layer 3 is available.

Further, an external interface may be provided to the conventional PHY layer 2. In this case, any desired data can be provided for the loop-back test through the external interface. This is effective in testing a unit that is data dependent, e.g., an encoding unit, and a bit stuffing unit.

The advantages of Embodiment 1 described above can be realized either by utilizing the UTMI/ULPI interface or by adding a low speed external interface for a speed that allows the test to be easily performed. In this way, the high-speed test at 480 MHz is possible without an expensive test jig. That is, the transmitting system and the receiving system can be operated by the sequence control unit 21 that operates at, for example, 60 MHz. Further, according to Embodiment 1, a result of the test can include information on presence of an error.

[Embodiment 2]

Figure 7:
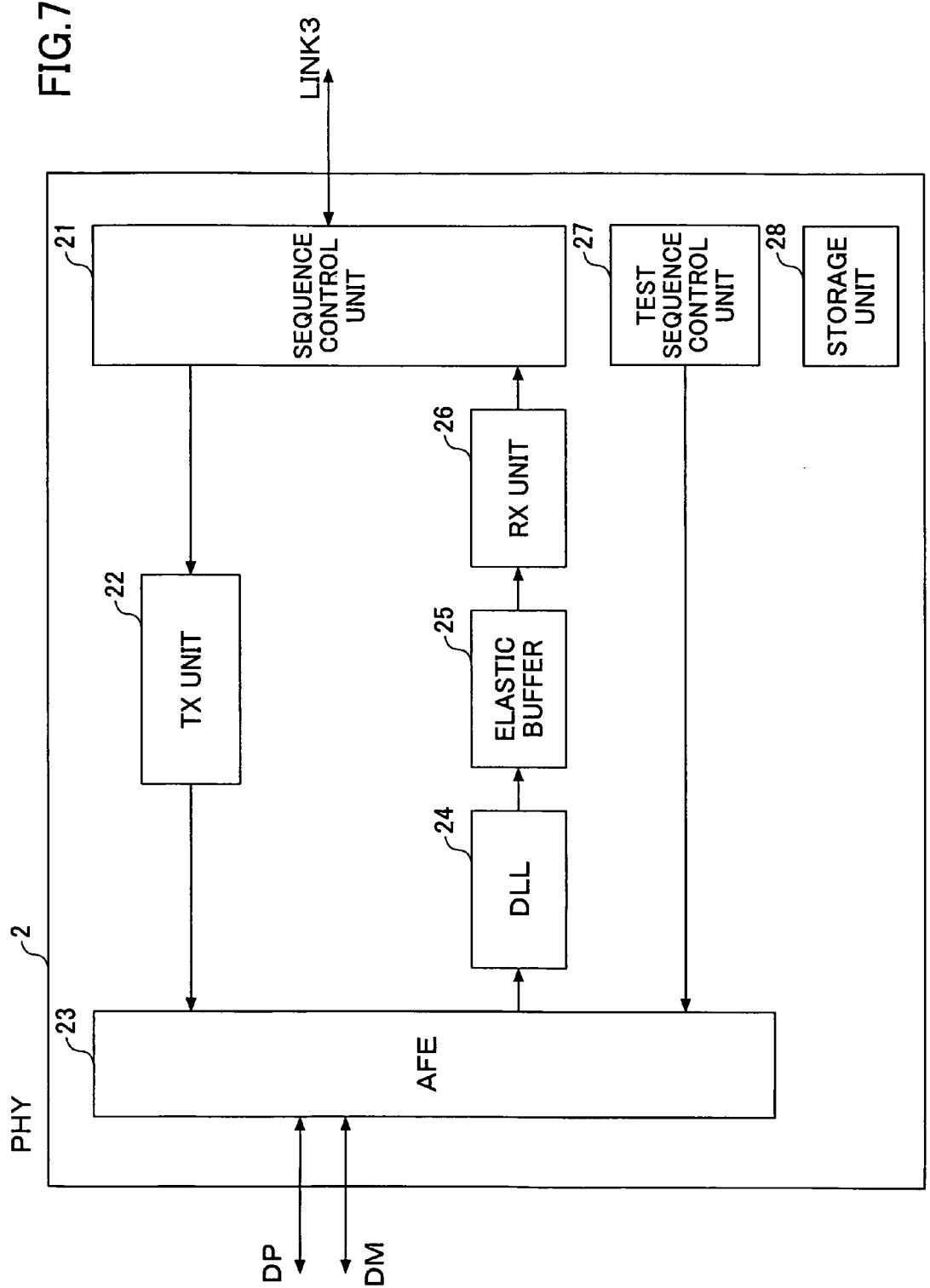
FIG. 7 is a block diagram of the PHY layer of a USB controller according to Embodiment 2 of the present invention.
Figure 8:
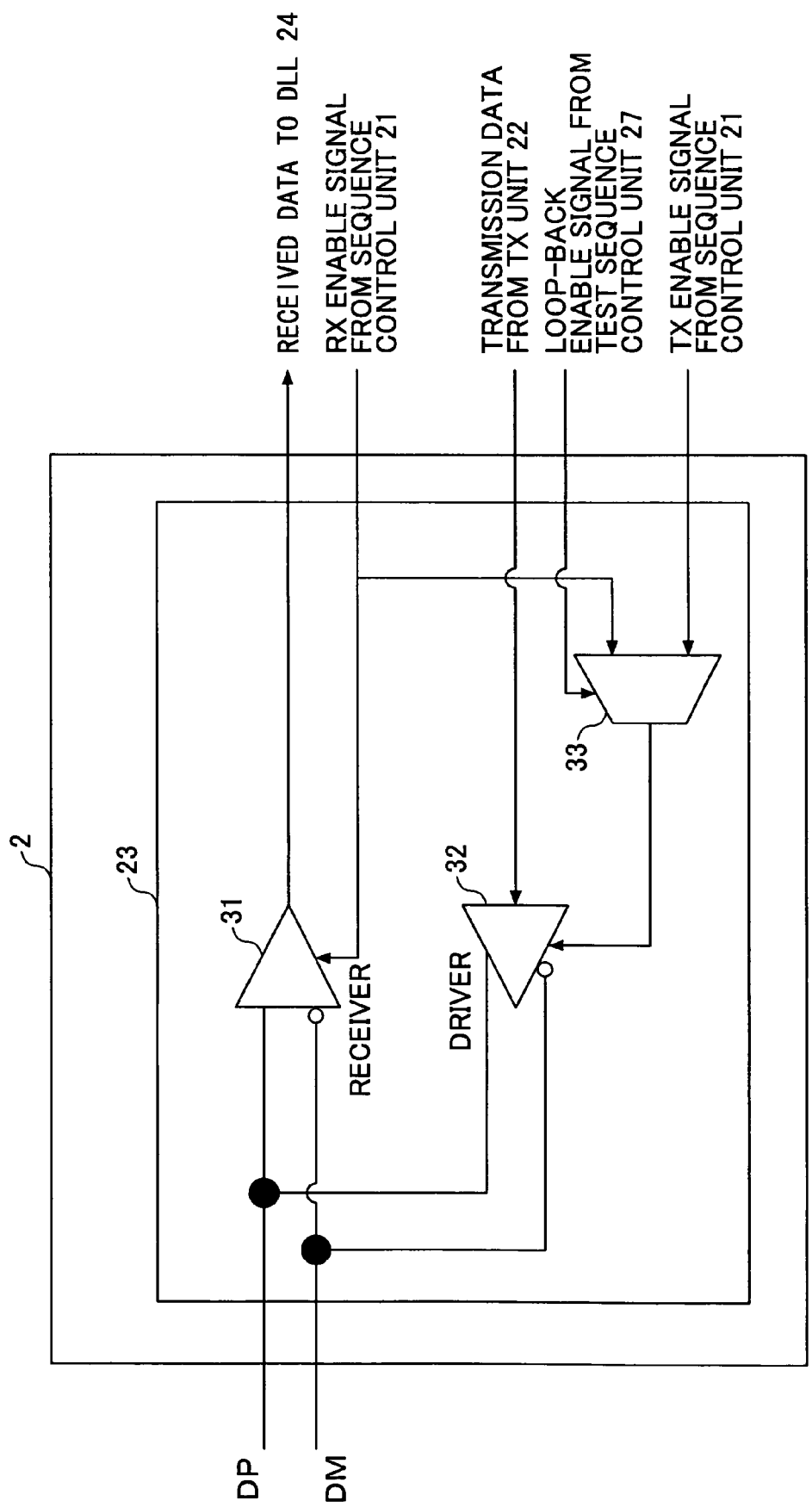
FIG. 8 is a block diagram of the AFE of the USB controller according to Embodiment 2 of the present invention.

Hereafter, the USB device controller according to Embodiment 2 of the present invention is described with reference to FIGS. 7 and 8. In Embodiment 1, when the functional test mode is selected, the multiplexer 33 provides the TX-enable signal to the receiver 31 with the configuration shown in FIG. 5. That is, both receiver 31 and driver 32 are controlled by the TX-enable signal.

Now, according to Embodiment 2, the receiver 31 and the driver 32 are controlled by the RX-enable signal, rather than the TX-enable signal.

(Configuration of PHY Layer)

First, a configuration example of the PHY layer 2 of the USB controller 1 according to Embodiment 2 is described with reference to FIG. 7. FIG. 7 is a block diagram showing the configuration example of the PHY layer 2 of the USB controller 1 according to Embodiment 2. The PHY layer 2 includes the test sequence control unit 27 and a storage unit 28 in addition to the conventional configuration as shown in FIG. 2. Accordingly, the test sequence control unit 27 and the storage unit 28 are described.

The test sequence control unit 27 is for controlling a sequence concerning the functional test of the USB controller 1. The sequence concerning the functional test is, for example, a transmitting sequence for transmitting data. In this case, the sequence control unit 21 controls the receiving sequence for receiving data.

In this way, the sequence control unit 21 controls the receiving sequence, and the test sequence control unit 27 controls the transmission sequence such that reception and transmission of data may be simultaneously carried out.

Here, the receiving system is independent of the transmitting system of the PHY layer 2. Further, the test sequence control unit 27 is activated only when the mode information is set to the functional test mode, wherein the mode information is stored in the register for mode setup (e.g., the normal operation mode, and the functional test mode) of the USB controller 1. In other words, the test sequence control unit 27 is for testing the conventional PHY layer 2 that is configured as shown in FIG. 2.

The storage unit 28, such as a register, is for beforehand storing data to be used in testing. The test sequence control unit 27 is activated when the operation mode is set to the functional test mode through the interface with the LINK layer 3, and performs a transmission process including a process of transmitting the test data stored in the storage unit 28 to the TX unit 22 of the transmitting system.

(Configuration of AFE)

Next, a configuration example of the AFE 23 of the USB controller 1 according to Embodiment 2 is described with reference to FIG. 8, which shows the configuration example of the AFE 23 of the USB controller 1 according to Embodiment 2. The configuration shown in FIG. 8 is different from the configuration shown in FIG. 5 (Embodiment 1) in that the output signal of the multiplexer 33 is provided to the driver 32. Accordingly, the multiplexer 33 is described.

The multiplexer 33 is for selecting one of the RX-enable signal and the TX-enable signal according to the loop-back enable signal received from the test sequence control unit 27, and the selected enable signal is provided to the driver 32. For example, in the normal operation mode, the TX-enable signal is provided to the driver 32 (same as FIG. 3), and in the functional test mode, the RX-enable signal is provided to the driver 32.

With the above configuration, both receiver 31 and driver 32 are activated by the RX-enable signal at the time of functional testing. Accordingly, even if the USB controller 1 is not connected to an external host PC, the outputs of the driver 32 are provided to the receiver 31 given that the outputs of the driver 32 are connected to the inputs of the receiver 31 within the USB controller 1. That is, the USB controller 1 is able to receive data that the USB controller 1 outputs and the loop-back test is attained.

Further, according to the USB controller 1 of Embodiment 2, the functional units, such as the TX unit 22, the AFE 23, the DLL 24, the elastic buffer 25, and the RX unit 26 that operate at 480 MHz, can be operated like in the real operations by providing the data stored in the storage unit 28 without any input/output from the outside through the DP/DM terminals.

The data stored in the storage unit 28 are processed for transmission, namely, the serializing process at 480 MHz, NRZI encoding, and bit stuffing by the transmitting system (TX unit 22). The processed data are then received by the receiving system (the DLL 24, the elastic buffer 25, and the RX unit 26), and are processed through bit de-stuffing, NRZI decoding, and parallelizing such that the original data are restored. If an error is generated in the processes above in the loop-back system, or synchronization goes wrong, an error is generated by the receiving system like in the real operations.

Further, the existing UTMI/ULPI register may be used to set up whether verification is possible, and the functional test mode (such as the normal operation mode or the functional test mode). In this case, no new interface pin for functional testing is required. Then, whether an error is present in the transceiver system can be determined by adding an error information storing register for storing the test mode setup, and information on the error generated in transmission and reception, and by reading a value in the register, wherein the register is accessible from the LINK layer 3 through the UTMI/ULPI interface.

Another difference of Embodiment 2 from Embodiment 1 is that the data received by the loop-back test can be read by an external apparatus through the interface with the LINK layers 3; this is because the sequence control unit 21 for controlling the interface with the LINK layers 3 controls the receiving sequence.

Further, an external interface may be additionally provided to the PHY layer 2 so that access to the storage unit 28 may be enabled. By enabling the access to the storage unit 28, replacing the test data is possible. This configuration is effective when detecting an error that is data-dependent.

The test jig for testing the USB controller 1 of Embodiment 2 is required to generate a signal of a low frequency such as 60 MHz, or alternatively 30 MHz, used by the interface of the LINK layer 3 like the Embodiment 1. This is not a high-frequency signal, but is a frequency that is available using a common test jig. Accordingly, the functional test of the USB controller 1 of Embodiment 2 can be performed with the simple configuration as described above.

Although Embodiment 1 and the Embodiment 2 of the present invention are described in above, a combination of the configurations of Embodiment 1 (FIGS. 3 and 4) and Embodiment 2 (FIGS. 7 and 8) is possible.

The functional test of the USB controller according to Embodiment 1 and Embodiment 2 can be made selectable. This can be realized by setting a pair mode in the register that is accessible through the interface between the LINK layer 3 and the PHY layer 2, or alternatively in the register accessible through the external interface. In this way, the interface between the LINK layer 3 and the PHY layer 2 can be tested in addition to testing the 480 MHz operations within the USB controller 1.

Further, the present invention is not limited to these embodiments, but variations, combinations, and modifications may be made without departing from the scope of the present invention.

The present application is based on Japanese Priority Application No. 2007-071613 filed on Mar. 19, 2007 with the Japanese Patent Office, the entire contents of which are hereby incorporated by reference.

What is claimed is:

1. A USB controller, comprising:
a link layer; and
a physical layer configured to receive data from the link layer; and
wherein said physical layer includes:
   a sequence control unit configured to output a transmitting enable signal and a receiving enable signal, and configured to control a sequence of transmission and reception of data based on the transmitting enable signal and the receiving enable signal;
   an analog front end configured to perform an analog-to-digital conversion process for data transmitted to the analog front end from the sequence control unit; and
   a test sequence control unit configured to transmit a loop-back enable signal to the analog front end;
wherein the analog front end includes: a drive unit configured to transmit transmission data; a receiver unit configured to receive reception data; and a switch unit;
wherein, when a test mode is selected as an operation mode, the physical layer transmits test data to the drive unit; the drive unit transmits the test data to the receiver unit; and the receiver unit transmits the test data to the sequence control unit; and
wherein the switch unit transmits the transmitting enable signal to the receiver unit, and causes the receiver unit to transmit the test data to the sequence control unit, based on the loop-back enable signal from the test sequence control unit.

2. The USB controller as claimed in claim 1, further comprising a low-frequency test jig that operates at 60 MHz.

3. The USB controller as claimed in claim 1, wherein the controller is configured to operate a loop-back test at rates up to and including the maximum rate of speed permitted within the USB 2.0 communication standard which is 480 MHz.

4. The USB controller as claimed in claim 1, further comprising: an error information storing register for storing error information concerning a loop-back test.

5. The USB controller as claimed in claim 1, further comprising:
a data storing register for storing transmitting data and/or receiving data for a loop-back test.

6. A method of testing a USB controller, comprising:
providing the USB controller with a link layer and a physical layer configured to receive data from the link layer, and wherein said physical layer includes: a sequence control unit configured to output a transmitting enable signal and a receiving enable signal, and configured to control a sequence of transmission and reception of data based on the transmitting enable signal and the receiving enable signal, an analog front end configured to perform an analog-to-digital conversion process for data transmitted to the analog front end from the sequence control unit, and a test sequence control unit configured to transmit a loop-back enable signal to the analog front end; and wherein the analog front end includes: a drive unit configured to transmit transmission data, a receiver unit configured to receive reception data, and a switch unit;
selecting a test mode as an operation mode for the USB controller, such that the physical layer transmits test data to the drive unit, the drive unit transmits the test data to the receiver unit, and the receiver unit transmits the test data to the sequence control unit; and
causing the switch unit to transmit the transmitting enable signal to the receiver unit, and causing the receiver unit to transmit the test data to the sequence control unit, based on the loop-back enable signal from the test sequence control unit.

7. The method of claim 6, wherein the test mode is set up in a register using an interface based on UTMI or ULPI of the USB controller.

8. The method of claim 6, further comprising the step of using a delay locked loop to adjust a frequency phase angle of a sampling clock according to data received by the receiver unit, and wherein the step of adjusting the frequency phase angle includes detecting an edge of received data.

9. The method of claim 6, further comprising the step of using an elastic buffer to synchronize data taken into a delay locked loop, such that a sampling clock speed is adjusted by the delay locked loop to a reference clock signal of 480 MHz.

10. The method of claim 6, further comprising the step of using bit stuffing to reverse signal polarity within the USB controller.

11. The method of claim 6, further comprising the step of performing synchronous data transmission between the physical layer and the link layer.

12. The method of claim 6, further comprising the steps of using the sequence control unit to control data transmission timing between the physical layer and the link layer, and using the sequence control unit to manage an error in data received by the physical layer, and to provide information on the error to the link layer.

13. The method of claim 6, further comprising the step of providing an error information storing register that is accessible from the link layer through a UTMI/ULPI interface.

14. The method of claim 6, further comprising the steps of providing an internal buffer, and using the internal buffer to store data received in a loop-back test.

15. The method of claim 6, further comprising the step of using an external apparatus to read data that is received during a loop-back test through an interface with the link layer.

* * * * *